United States Patent [19]

Wodeslavsky et al.

[11] Patent Number: 5,650,564

[45] Date of Patent: Jul. 22, 1997

[54] FLUID DRIP DETECTION SYSTEM

[76] Inventors: Josef Wodeslavsky; Shirly Wodeslavsky, both of #5 Peter Lynas Ct., Henafly, N.J. 07670

[21] Appl. No.: 633,114

[22] Filed: Apr. 16, 1996

Related U.S. Application Data

[63] Continuation-in-part of Ser. No. 488,569, Jun. 6, 1995.

[51] Int. Cl.$^6$ .............................. G08B 21/00; G01N 27/00
[52] U.S. Cl. ........................... 73/49.2; 73/40; 73/40.5; 73/861.41; 73/40.5 R; 340/605; 340/610; 324/71.1; 137/312; 137/624.12
[58] Field of Search ........................... 73/40, 40.5, 49.2, 73/861.44, 861.71; 340/605, 606, 604, 611, 612; 137/312, 313, 624.11, 624.12

[56] References Cited

U.S. PATENT DOCUMENTS

| | | | |
|---|---|---|---|
| 3,416,560 | 12/1968 | Bruno | 137/456 |
| 3,776,249 | 12/1973 | Wailes et al. | 137/14 |
| 4,061,893 | 12/1977 | Sanner | 200/38 D |
| 4,180,088 | 12/1979 | Mallett | 137/87 |
| 4,249,565 | 2/1981 | Brust | 137/495 |
| 4,252,088 | 2/1981 | Frisby | 122/507 |
| 4,694,161 | 9/1987 | Sackett | 250/231 R |
| 4,730,637 | 3/1988 | White | 137/62 |
| 4,791,414 | 12/1988 | Griess | 340/606 |
| 4,796,658 | 1/1989 | Caple | 137/312 |
| 4,963,857 | 10/1990 | Sackett | 340/606 |
| 4,994,749 | 2/1991 | Davies et al. | 324/637 |
| 5,040,409 | 8/1991 | Kiewit | 73/40.5 A |
| 5,056,554 | 10/1991 | White | 137/486 |
| 5,091,715 | 2/1992 | Murphy | 340/604 |
| 5,214,387 | 5/1993 | Fenner | 324/557 |
| 5,240,022 | 8/1993 | Franklin | 137/1 |
| 5,267,587 | 12/1993 | Brown | 137/624.12 |
| 5,355,350 | 10/1994 | Bass et al. | 367/13 |
| 5,381,097 | 1/1995 | Takatori et al. | 324/512 |
| 5,463,377 | 10/1995 | Kronberg | 340/605 |

*Primary Examiner*—Hezron E. Williams
*Assistant Examiner*—J. David Wiggins

[57] ABSTRACT

A fluid drip detection system which is not prone to false alarms caused by the presence of dirt or solid particle contaminants in the fluid. The fluid drip detector comprises; a conducting hollow housing for permitting fluid flow and passage therethrough, the housing having a first and second conducting seats. A first conducting door is urged against the first seat and a second conducting door is urged against the second seat. The first and second doors disengage from their respective seats in a drip condition and in response to fluid movement. A conducting rod is connected to one of the doors and is slidingly fitted into a bore in the other door, such that in a no drip condition, if one of the doors is disengaged from its seat by dirt, the other door can still engage its seat, and a lead connected to the housing, for producing an electrical output in the event of a drip. Such electrical output is transmitted to a timer unit that can control the fluid flow by controlling a cut off valve. Such timer can be set both manually, by the user, or remotely, by an electrical signal from the fluid drip detector; where the electrical signal from the fluid drip detector is activated by opening and closing any fluid valve in the system.

17 Claims, 7 Drawing Sheets

FLUID DRIP DETECTION SYSTEM

This application is a continuation in part application of application Ser. No. 08/488/569 filed on Jun. 6, 1995.

FIELD OF THE INVENTION

The present invention relates generally to safety devices for shutting off the fluid supply when there is a fluid drip or a leak, or to devices which inform a central station that the fire sprinklers are activated. More particularly, the present invention relates to a construction which detects a drip by detecting an increase in electrical resistance. More particularly, the present invention relates to a system having any detecting means which provides an output signal upon detecting fluid drips/leaks/movement and inputs such output signal to a timer means which responds by actuating and deactuating a fluid shut off valve. Even more particularly, the present invention relates to a system having a detecting means which provides an output signal upon detecting changes in electrical resistance resulting from fluid drips/leaks/movement, and inputs such output signal to a timer means which responds to such changes in electrical resistance by actuating and deactuating a fluid shut off valve. Such timer means can be remotely actuated by opening and closing fluid valves.

Also, this invention relates to systems which detect fluid accumulation or movement and in response, actuate pumps or similar devices that drain out such accumulated fluid.

BACKGROUND OF THE INVENTION

The present fluid drip detector is an improvement over the detector disclosed in U.S. Pat. No. forthcoming to issue. In that invention, a valve body comprised a single door engageable with a seat. In a no drip condition, the door would be urged against the seat. In a drip condition, a film of water would form between the door and the seat. By measuring the electrical resistance between the door and the seat, a drip can be detected as its characterized by an increase in electrical resistance. Thus, in case of a drip, the electrical resistance between the door and the seat would increase, signaling the user that a drip has occurred and/or shutting off the fluid supply. It was discovered, that in case the fluid contained impurities, dirt, dust or solid particles, a build up of such impurities or corrosion could occur between the door and the seat, resulting in an increase in the electrical resistance there between, which in turn would cause an alarm to go off and/or the fluid supply to shut off. Thus, although there was no drip, the alarm could have gone off and/or the fluid supply could have shut off. Therefore, when the fluid contained impurities and dirt, the device was prone to false alarms.

Thus, it is the object of the present invention to provide a fluid drip detector which would not cause false alarms. It is an object of this invention to provide a detector which would only shut off the fluid supply in case of a fluid drip, and not in case of a build up of impurities between the door and the seat. It is therefore an object of this invention to provide an electrical resistance detector which would distinguish between a building up of impurities between the door and the seat, and a sheet of water between the door and the seat. It is a further object of the present invention to provide a fluid drip detector having a dual door and seat configuration, where, in case dirt accumulates between the first door and seat, if there is no drip, no false alarm would occur.

It is an additional object of the present invention to provide an improved timer unit, which can be used with any fluid detector that produces an electrical output in case of fluid drip, flow or movement. It is a further object of this invention to produce a timer unit which can provide the user additional features such as: override and warning features. It is yet another object of the present invention to provide a timer unit which can be activated either manually, by the user, or remotely, by an electrical signal from any fluid detector; which is produced by the quick opening and closing of any fluid valve in the system.

DETAILED DESCRIPTION OF THE DRAWINGS

Figure 1:
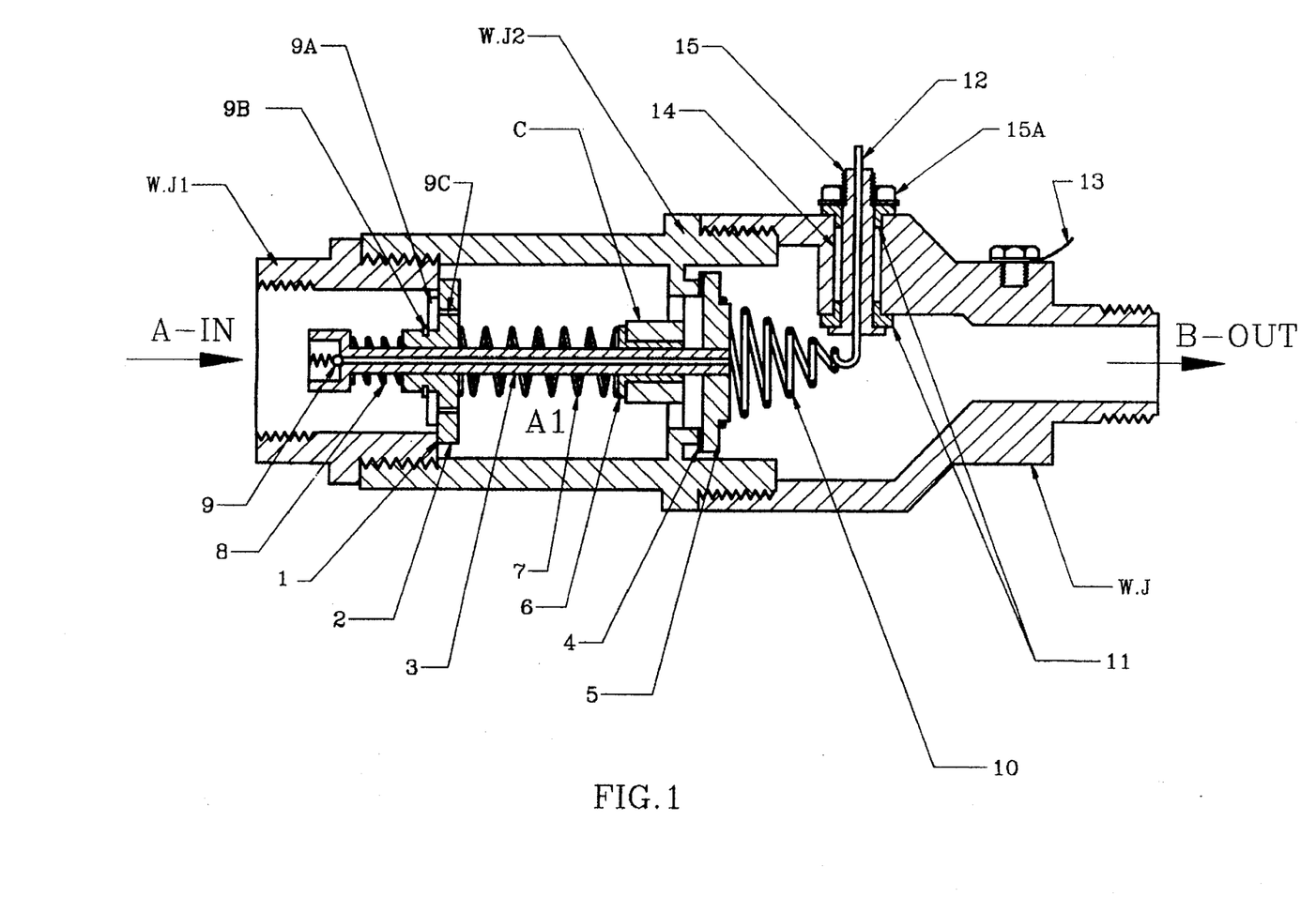
FIG. 1 is a diagram of the present invention in a condition of no fluid movement.

FIG. 1 illustrates the drip detector in a no drip condition. A first threaded housing WJ has a first end B and a second threaded end. Housing WJ has a lead 13 and a bore 14. Two electrical resistance bushings 11 and a hollow bolt 15 are inserted in bore 14. The bolt 15 is tightened to housing WJ via nut 15A. A first spring 10 has one end protruding from bolt 15, making lead 12. A second threaded housing WJ2 is threaded onto the second end of housing WJ. The second end of housing WJ2 has seat 4. Housing WJ2 also has an internal bushing C. A highly electrically resistive shouldered sleeve 6 is inserted into bushing C. A roll 3, having a first end and a shouldered end, is situated in housing WJ2. The first end of rod 3 fits by sliding into sleeve 6 and is bolted to a first door 5, which is urged by spring 10 against a first seat 4. The shouldered end of rod 3 fits by sliding into a bore of second door 2. A plug WJ1 is threaded into the thread of housing WJ2. Plug WJ1 has a first end near the first end of housing WJ2, and a second end A. The first end of plug WJ1 forms a seat 1. A spring 7, situated between sleeve 6 and door 2, urges door 2 against seat 1. A third spring 8 is situated in plug WJ1, between door 2 and the shouldered end of rod 3. An electric resistance detector [not shown] is connected between leads 12 and 13. If the electrical resistance between the leads is high, a drip has been detected and the user will be notified, and/or the fluid shutoff valve [not shown] will be activated, shutting off the water.

Normally, when the water is clean and there is a no drip condition, the first door 5 is urged against the first seat 4 via first spring 10, and, the second door 2 is urged against the second seat 1 via the second spring 7. Thus, in a no drip condition, when both doors are making an electrical contact with their respective seats, the electrical resistance between lead 12 and lead 13 is at a minimum. Sometimes, if the fluid is not pure, there may be an accumulation of dirt between one of the doors and its respective seat. In such a case, one of the doors may not be contacting its respective seat, while the other door is. Even in such a case, where one door does not make electrical contact with its respective seat, so long as one door is making contact with its respective seat, the electrical resistance between leads 12 and 13 will still be at a minimum. Thus, if there is no drip, regardless of whether there is or there is no dirt accumulation between one of the doors and its respective seat, the electrical resistance between lead 12 and 13 will be at a minimum.

Figure 2:
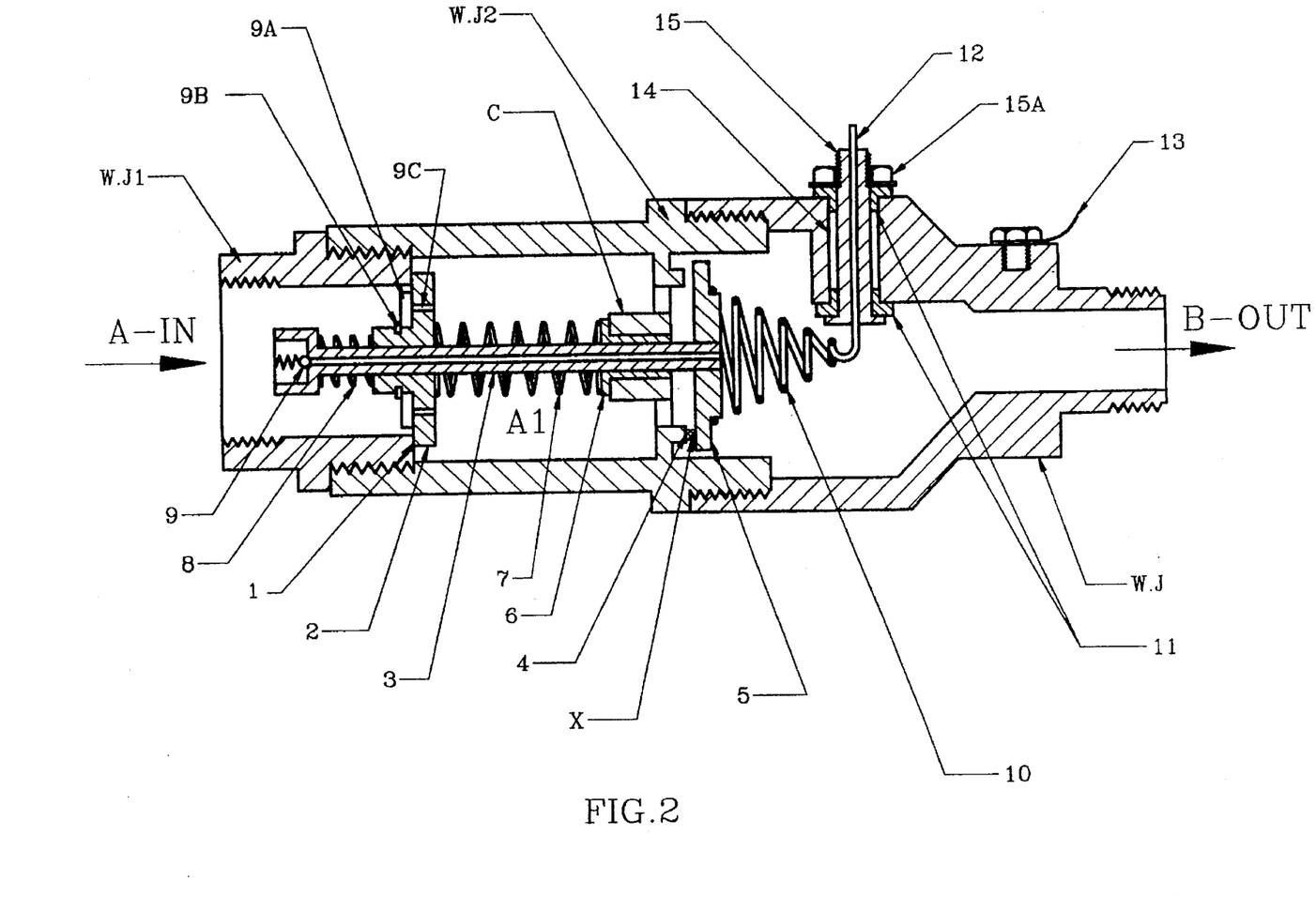
FIG. 2 is a diagram of the present invention where there is accumulation of dirt.

FIG. 2 illustrates a situation where a dirt particle X is separating door 5 from seat 4. Because rod 3 is not fixedly connected to door 2, rod 3 allows door 5 and 2 to move independently of one another. In other words, because rod 3 slidingly fits into the bore of door 2, when there is dirt separating door 5 from seat 4, the movement of door 5 away from seat 4 does not pull door 2 away from seat 1. Therefore, in case dirt separates door 5 from seat 4, door 2 still engages seat 1. A close look reveals that a closed circuit exists in such a situation because lead 12 is connected to spring 10 which is urged against door 5 which is bolted to rod 3 which is slidingly fitted into door 2 which is urged against plug WJ1. Therefore, even if door 5 disengages from seat 4, there is an electrical short circuit, characterized by a low level of resistance between lead 12 and 13. Similarly, if the dirt particle was present between door 2 and seat 1, door 2 would slide on rod 3 away from seat 1, while door 5 would remain in contact with seat 4. In this case, a closed circuit exists because lead 12 is connected to spring 10 which is urged against door 5 which contacts seat 4. Thus, so long as one door engages its respective seat, an electrical circuit still exists because of the presence of rod 3. It should be noted that its unlikely to have both doors separated from their respective seats with dirt because when fluid will be in use, the dirt existing between each door from its respective seat will be pushed out with the water movement.

Figure 3:
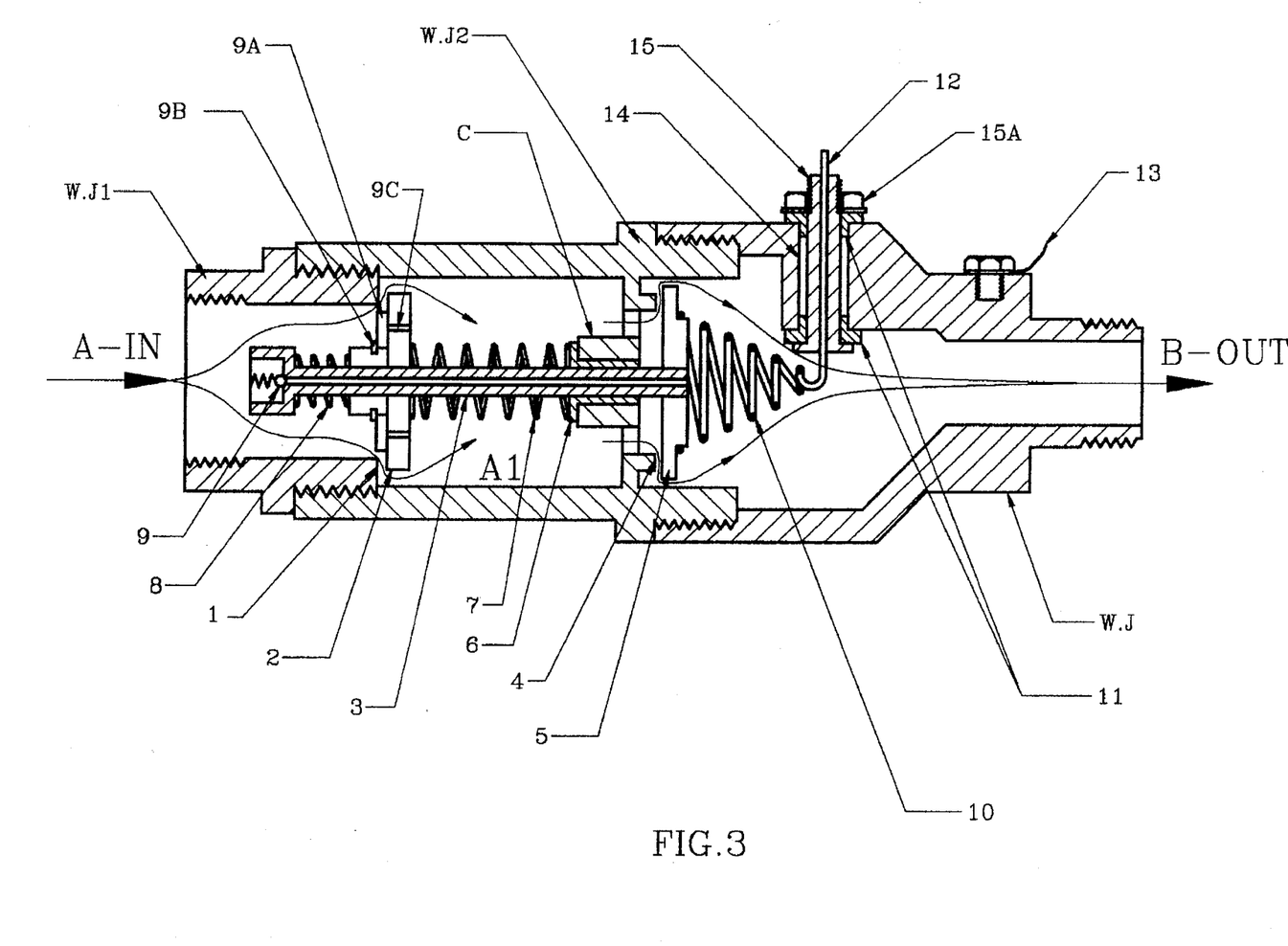
FIG. 3 is a diagram of the present invention where there is a drip.

FIG. 3 illustrates the drip detector in a drip condition. When there is a drip, both doors 2 and 5 move away from their respective seats, 1 and 4, breaking the electrical circuit, resulting in an increased electrical resistance between leads 12 and 13, notifying the user of a leak, and/or shutting off the fluid supply. The arrows in FIG. 3 show the fluid movement from inlet A-IN to outlet B-OUT.

A spring 8 is located between the shoulder of rod 3 and door 2 in order to maintain continuous electrical contact there between. A first one-way valve 9 is situated in the rod 3, permitting back pressure from outlet B to vent to inlet A, such that the pressure at outlet B and inlet A is kept equal. A second one-way valve 9A, for instance, perhaps a washer, is mounted in door 2, controlling a bore 9C located in door 2 by the washer or one-way valve 9A and a spring 9B. One-way valve 9A allows back pressure from chamber A1, formed between door 2 and 4, to vent out to inlet A. Thus, the presence of the one way valves serves to maintain equal pressure in the chambers of the drip detector in a no drip condition.

My prior invention illustrated how two resistance detection means are used in order to distinguish between a drip and a leak. One of the detection means would notify the user if a small drip existed, while the other would notify the user in case a large flow of fluid took place. Thus, the user would know the extent of the fluid waste, and the urgency of the situation. There are other resistance detection configurations which can distinguish between drips and leaks. For example, a resistance detector, such as an ohm meter can be used. In such a case, as an example, when a drip occurs, the resistance between leads 12 and 13 will increase from 0 to 15 ohms. if the ohm meter reads 15 ohms, it will drive a first comparator which will provide a signal that a small drip occurred. If more fluid leaks out, separating the doors from the seats even more, the ohm meter will read an increased resistance. In such a case, the ohm meter will drive a second comparator which will signal the presence of a leak. Each of the comparators can drive a separate visual indicator, one indicating a small drip, and the other indicating a leak. Having two comparators can also serve as a safety device, if one fails, the other will provide the signals.

The electrical contacts in the detector are continuously immersed in fluid. Using AC current between said contacts, instead of DC current, is one possible way to design the system.

The timer, disclosed in the prior application, provides the user with a selector for choosing a period of time over which fluid can be in use without triggering the shut off valve. Such a timer can be used in combination with any existing fluid drip, flow or movement detectors, which may not be able to detect small drips, but may be able to detect fluid movement. An improved timer unit provides additional features such as override and warning features.

The improved timer unit, actuated by electrical signals from the output of the fluid drip detector, or from any other fluid drip, flow or movement detection systems, can provide the user a variety of features such as override mode or warning mode. By opening and closing any fluid valve, the user can remotely control the fluid detector to send such electrical signals to the timer, placing the timer in a particular mode.

The improved timer has three features. The first feature, controlled by a selector and timing circuit, enables the user to chose the period over which the system will allow the user to freely use the water without having the shut off valve shut off the fluid during such period. The second feature is an overriding feature, controlled by an overriding circuit, allowing the user, by a quick opening and closing of any fluid valve, to have a longer period over which fluid can be used without activating the shut off valve. The third feature, controlled by a warning circuit, notifies the user who has been using the water that water will be shut off soon, if the user does not place the system in override mode.

The timing circuit has a selector having a number of settings, each permitting water usage for a different period. By way of example only, the timer can have three settings: a short mode of 10 seconds, a mid range mode of 5 minutes, and a long mode of 30 minutes. If the user sets the selector on the 10 second setting, the user can use the water for 10 seconds. The timer will react to all water drips or leaks lasting longer than 10 seconds, notifying the user of a drip or a leak. Similarly, if the user sets the selector on the 5 minutes range, the user can use the water for as long as 5 minutes. Any fluid movement lasting longer than 5 minutes will activate the timer to notify the user and actuate the shut-off valve.

In order for the system to react to drips and leaks immediately when they start or shortly thereafter, the user should set the selector on the short period, or the mid range period. In order to allow the user to take a shower or make a fire sprinkler test or make use of the water for longer than the period set on the selector, the improved timer unit provides the override feature. The override feature will extend any short period set on the selector to a long determined period, for example 30 minutes. Each time the override feature is activated, the user has 30 minutes in which to use the water, even though the selector is set on the 5 minute mode. At the end of the 30 minutes, the period-setting originally set on the selector, 5 minutes, is reverted back to.

The override feature can be activated remote from the timer. One way to activate the override feature is by quickly opening and closing any water valve in the house. Thus, if the setting on the selector is 5 minutes, and the user desires to take a shower lasting longer than 5 minutes, than the user can quickly turn the water in the shower on and off. This will provide the user with 30 minutes of water. At the end of the 30 minutes, the system automatically reverts back to the period selected on the timer, 5 minutes. The user can repeatedly activate the override feature in order to extend the use of the water for a new period of 30 minutes.

Since the system can be placed in override mode through quickly opening and closing any of the water valves in the house, the user need not set to the timer on the long setting each time water is needed for a prolonged period. Thus, the override feature allows the user to select a short period on the selector, while enjoying the flexibility of having prolonged water usage whenever needed. In other words, the override feature lets the user keep the detection system on high sensitivity—reacting to short leaks, while having the ability to take long showers, without the inconvenience of having to go and change the time mode on the selector.

The warning feature, warns the user that the selector is set on 5 minutes, and the 5 minutes are almost up, and that the water will soon shut off completely if the user does not put the system in override. The warning signal, for example, could be a short period in which water is suspended, notifying the user that the water will soon shut off. After the short time in which water is suspended, water resumes flowing until the 5 minutes are up, during which time period the user must place the system in override mode, in order to continue using the water. Thus, for example, suppose that the user has the timer set on a period of 5 minutes, and takes a shower. If the warning circuit is set to warn the user after 3.5 minutes, then 3.5 minutes after the user opens the water, the water at the shower will shut off for a few seconds—warning the user that the system is set on 5 minutes. Then, the water resumes flowing for 1.5 minutes. During this 1.5 minutes, the user could place the system in override, in order to have a 30 minute shower. If the user does not place the system in override, the water will be shut off by the shut-off valve at the end of the 1.5 minutes.

Figure 4:
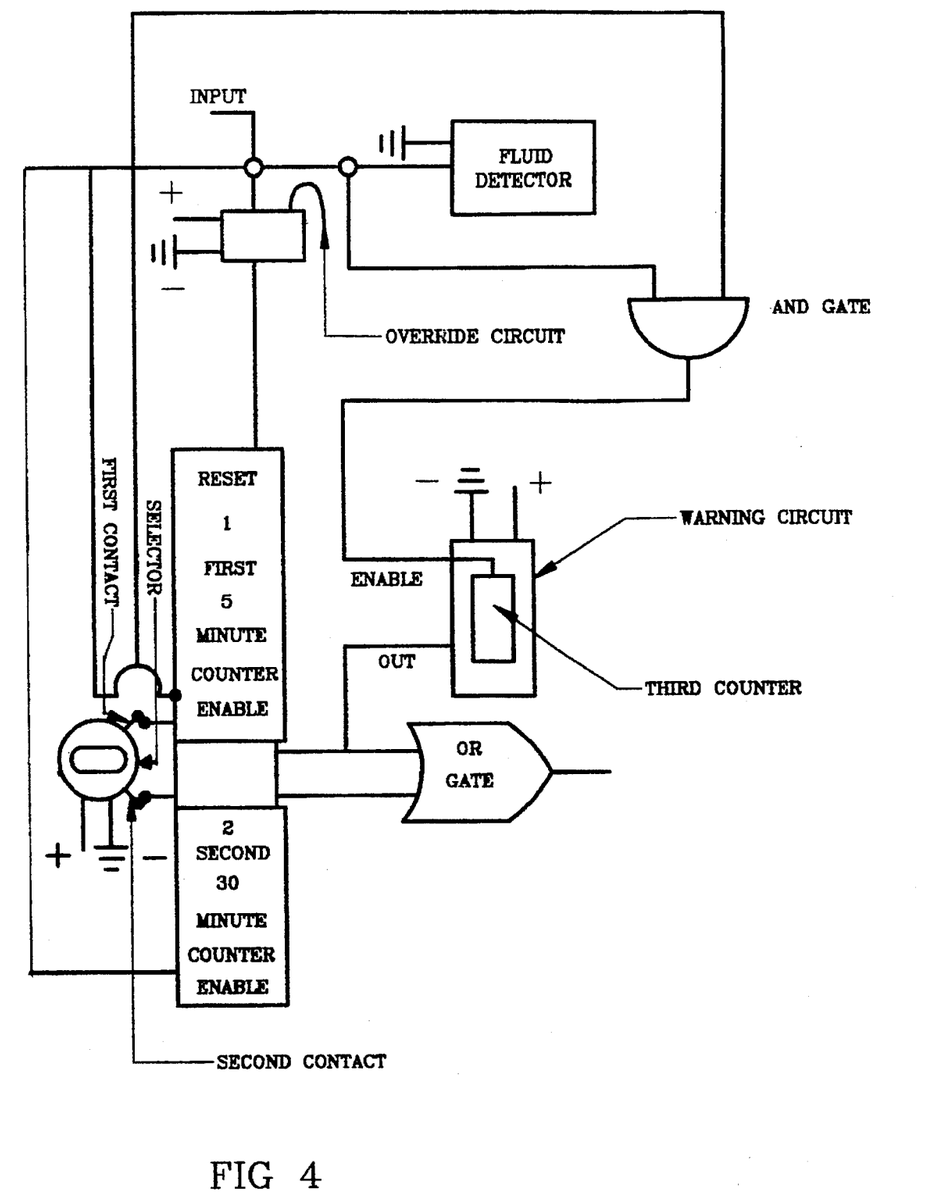
FIG. 4 is a block diagram of the timer unit, set on 5 minutes.

FIG. 4 illustrates one possible construction for the timer unit. The timing circuit comprises a selector, having a first and second contacts, the first contact is engageable with the input of a first, 5 minute counter, and the second contact is engageable with the input of a second, 30 minute counter. The output of each counter is connected to an input of an OR gate. The output of the OR gate is connected to a relay circuit [not shown], which is connected to a cut-off valve [not shown]and/or a indicating signal [not shown]. The output of a fluid drip/flow/movement detector is connected to the enable inputs of the first and second counters. The output of the detector is also connected to the input of an override circuit. The override circuit comprises a combination of elements which can only produce an output when the output of the drip detector is high for a predetermined time period. The output of the override circuit is connected to the reset circuit input of the first counter. A warning circuit, comprising a third counter, is enabled by the output of an AND gate, whose first input is from the first contact of the selector and whose second input is from the output of the fluid drip/flow/movement detector. The output of the warning circuit is connected to an input of the OR gate.

In operation, in order to set the timer to a short period, the selector's first and second contacts are engaging the inputs of the first and second counters, respectively. When any fluid valve will be opened, the fluid drip/flow/movement detector will enable both first and second counters. Since the output of the first, 5 minute counter, will go high first, before the output of the second, 30 minute counter, will go high, the first, 5 minute counter will drive the OR gate. Therefore, when the 5 minutes are up, the first counter will drive the relay circuit to actuate a cut off valve or/and indicating means.

In order for the user to remotely change the setting from 5 minutes to 30 minutes, the user must place the system in override mode. This is accomplished by opening any fluid valve for a preset time, such as 2 seconds, and then closing the valve. If the user opens the fluid valve for 2 seconds, the fluid drip/flow/movement detector will output a short signal of a short predetermined length. The override circuit is designed to output a signal only when the detector's output signal is of such short predetermined length. If any fluid valve is opened for a longer period, the overriding circuit will not be activated. When the overriding circuit is activated, its output disables the first counter, such that only the second, 30 minute counter, keeps counting. Thereby, the period during which fluid can be continuously in use has been remotely extended by the user from 5 to 30 minutes. Now, when the 30 minutes are up, the OR gate will activate the relay, to activate the shut off valve and/or the indicating means.

Whenever, the output of the fluid drip/flow/movement detector is high and, simultaneously, the first contact of the selector is engaging the first counter, the warning circuit is activated. The counter of the warning circuit can be set to have any duration shorter than the duration of the first counter, i.e., shorter than 5 minutes. Assume that the duration of the warning counter is 3.5 minutes. When the 3.5 minutes are up, the warning circuit outputs a short-temporary signal to the OR gate, which temporarily actuates the circuit which temporarily activates the shut-off valve and/or the indicating means. When the warning circuit stops outputing the short signal, the shut off valve is deactivated, and fluid can resume flowing. If the user does not place the system in override, as described above, when the 5 minutes are up, the first counter will output a signal to the OR gate which will shut off the fluid supply and/or trigger the indicating means.

Figure 5:
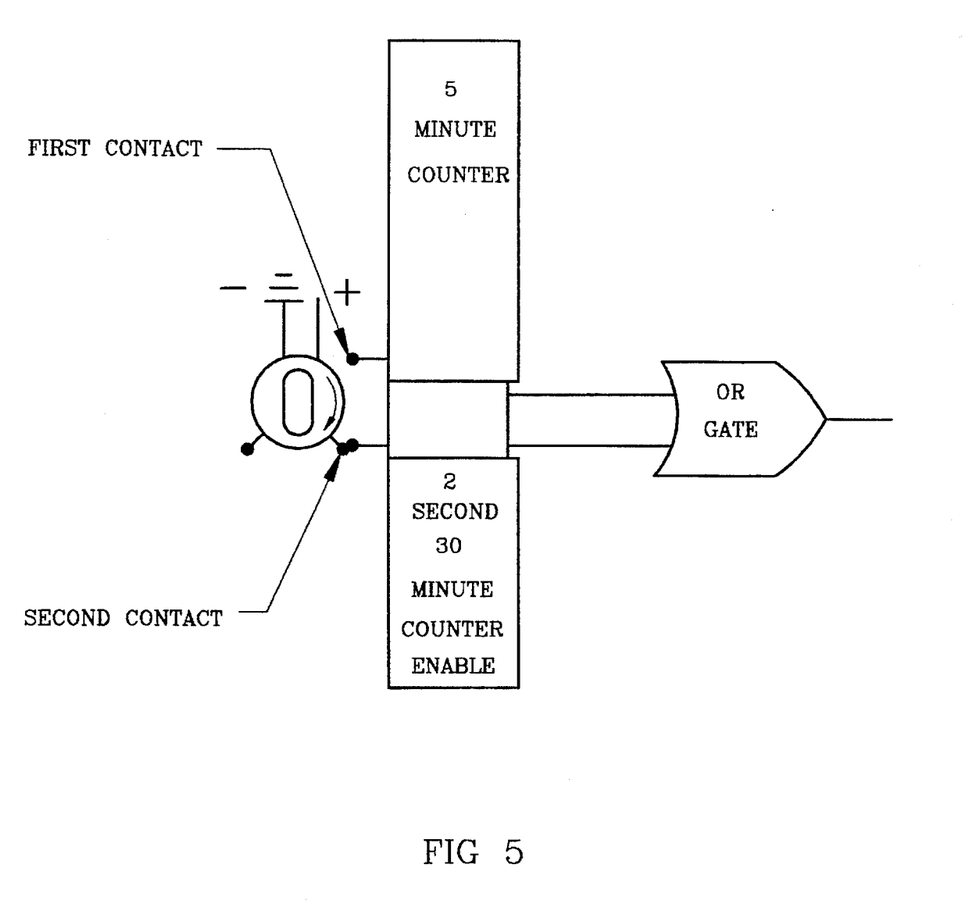
FIG. 5 is a block diagram of the timer unit, set on 30 minutes.

FIG. 5 illustrates the timer unit when the selector is set on 30 minutes. In such a situation, only the second contact of the selector is connected to the second, 30 minute counter. Thus, at the end of the 30 minutes, the counter outputs a signal to the OR gate, which activates the shut-off valve and/or the indicating signal.

Figure 6:
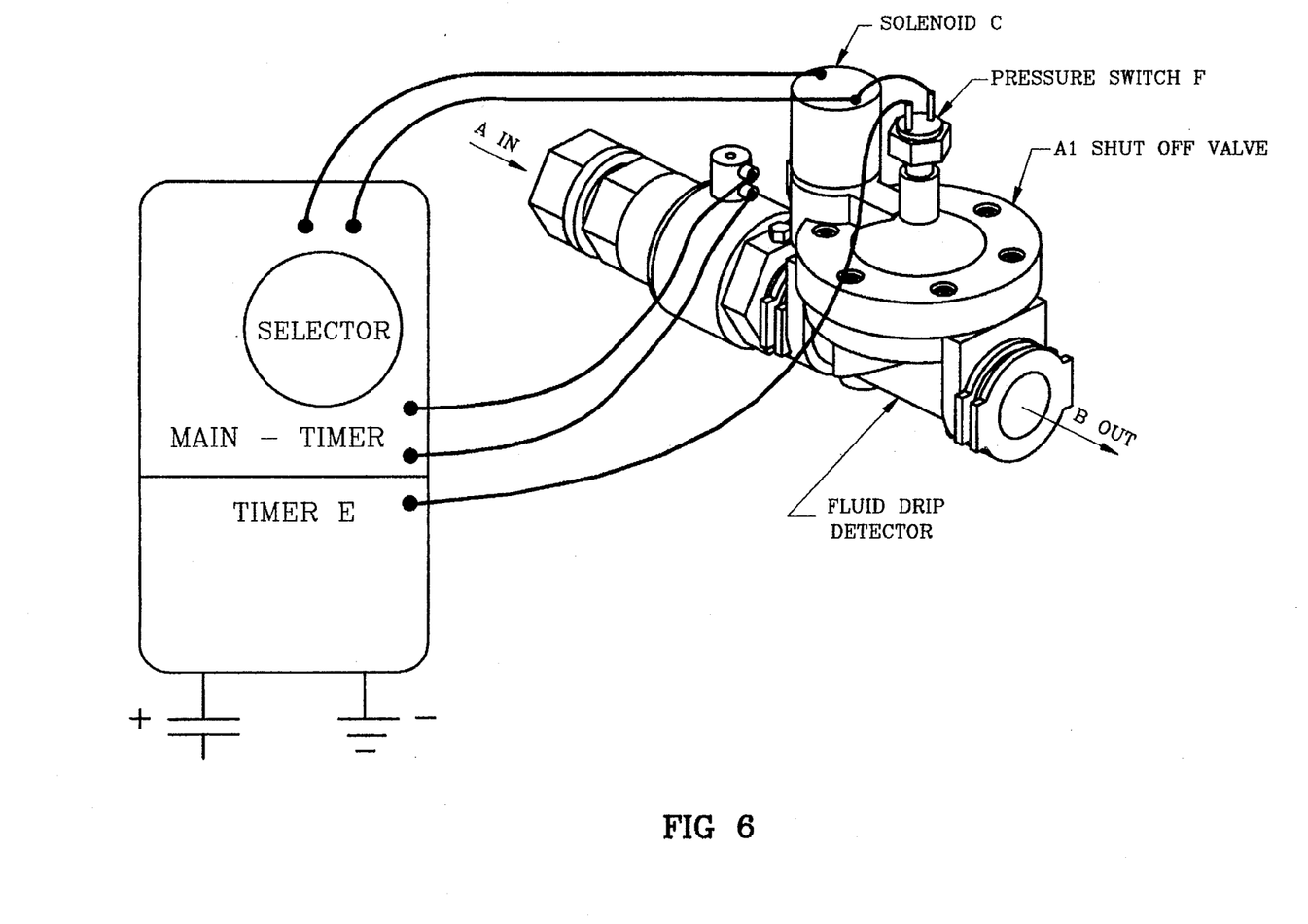
FIG. 6 is a diagram of a false-alarm-deactivating means.

FIG. 6 shows a configuration of a false-alarm-deactivating means which reopens fluid communication in case of a false alarm. A shut off valve A1 has a fluid inlet A and outlet B. The shut off valve A1 has a solenoid C, which can cut off fluid communication between A and B. A pressure switch F is situated at outlet B. Pressure switch F powers a timer E only if switch F is powered by solenoid C and if switch F is under fluid pressure. Since, during a false alarm, the pressure at outlet B does not drop, power switch F is under pressure in case of a false alarm. Thus, in case of a false alarm, after solenoid C cuts off fluid communication between inlet A and outlet B, because of the pressure at outlet B, pressure switch F will activate timer E. In turn, timer E resets the main timer unit to open the fluid supply, such that fluid can resume flowing. The pressure switch can be used for other functions, such as notifying the user of the status of the shut off valve.

In addition, any programmable chip can be connected to the output of the detecting means in order to provide additional features. By opening any fluid valve for a certain preset period, and then shutting the fluid valve, the programmable chip could be enabled, activated or reprogrammed, and thus produce the desired result for which the chip is designed.

Figure 7:
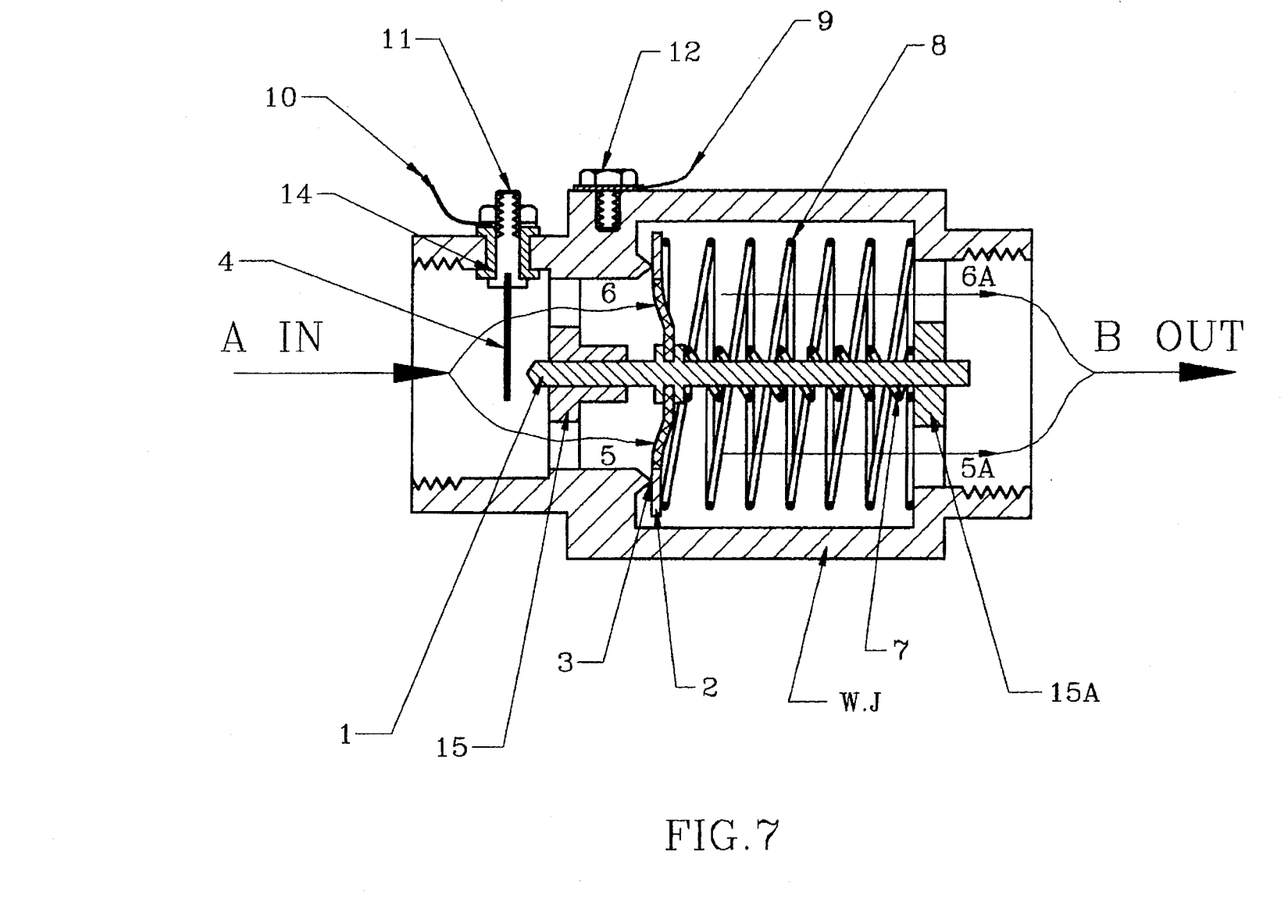
FIG. 7 is a diagram of a very sensitive device.

FIG. 7 will illustrate an embodiment which consists of hollow housing WJ with a fluid inlet A and an outlet B. A seat 3 in contained in the housing. Guides 15 and 15A guide rod 1. A flexible door 2 is connected to rod 1. A spring 8 urges door 2 against seat 3 to close communication between inlet A and outlet B. A spring 7 urges rod 1 against rod 4 to make electrical communication between them and close the electrical loop to the housing WJ. Rod 4 is electrically insulated from housing WJ by the electrically-resistant material from which sleeve 14 is made. Lead 9 is bolted to housing WJ.

If all the valves in the system remain closed, the pressure on the surface of flexible door 2 from both sides is equal, and the spring 8 will keep door 2 firmly on seat 3, and spring 7 will keep rod 1 touching rod 4. Spring 7 on the other side touches housing WJ and keeps closed electrical communication from rod 1 to the housing WJ and to lead 9, therefore maintaining a closed loop between lead 10 and lead 9.

In case of a minute leak, the pressure will start to drop on the surface of door 2 from the side of the outlet. Since spring 7 is weaker than spring 8, the center of the door will start to give, pulling rod 1 from rod 4, breaking the electrical contact even before any drip occurs. If the pressure continues to drop, the pressure differential will push door 2 against spring 8 to open the fluid flow from the inlet and to the outlet. Arrows 5, 5A, 6 and 6A illustrate the direction of the fluid flow.

We claim:

1. A fluid drop detector for sensing presence of fluid droplets and leaks via measured changes in electrical resistance comprising:

a hollow housing for permitting fluid flow and passage therethrough of fluid from a fluid supply, the housing having a first and second conducting seats disposed therein;

a first conducting door urged against the first seat;

a second conducting door urged against the second seat, where both the first and second doors disengage from their respective first and second seats in a drip condition and in response to fluid movement that accompanies the occurrence of a drip or leak condition at the locations of said first and second doors;

an electrically conducting engaging means, engaging the first and second doors, such that in a no drip condition, if only one door is disengaged from its respective seat due to a mechanical malfunction or particle blocking of the second door, the other door can still engage its respective seat, and a first conducting lead is in electrical communication with the first and second seats and the second conducting lead is in electrical communication with said first and second conducting doors, further having electrical connections to an ohmmeter instrument or other resistance detector means for providing an electrical output in response to a change in the electrical resistance occurring between each door and its respective seat, where the first and second conducting leads are electrically isolated from each other by means of a resistive sleeve disposed around one of each of said conducting leads.

2. A fluid drop detector for sensing presence of fluid droplets and leaks via measured changes in electrical resistance comprising:

a conducting hollow housing for permitting fluid flow and passage therethrough, the housing having a first and second conducting seats disposed therein;

a first conducting door urged against the first seat;

a second conducting door urged against the second seat, where both the first and second doors disengage from their respective first and second seats in a drip condition and in response to fluid movement that accompanies the occurrence of a drip or leak condition at the locations of said first and second doors;

an electrically conducting engaging means, engaging the first and second doors, such that in a no drip condition, if only one door is disengaged from its respective seat due to a mechanical malfunction or particle blocking of the second door, the other door can still engage its respective seat, and a first lead connected to the hoursing and a second lead connected to said electrically conducting engaging means, where said first and second leads are connected across an electrical measurement meter for providing an electrical output in response to a change in the electrical resistance occurring between each door and its respective seat, a first conducting lead is in electrical communication with the first and second seats respectively and the second conducting lead is in electrical communication with said first and second conducting doors, further having an electrical connections to an ohmeter instrument for providing an electrical output in response to a change in the electrical resistance occurring between each door and its respective seat whenever said first and second doors are not engaged upon said first and second seats.

3. A fluid drip detector as in claim 1, wherein the electrically conducting engaging means is a rod connected to one of the doors and is slidingly fitted into a bore disposed in the other door, such that in a no drip condition, if one of the doors is disengaged from its respective seat by dirt or solid particle contaminants to assume a non-operating status, the other door can still engage its respective seat to indicate a no drip or a no leak condition independent of the operating status of the disengaged door.

4. A fluid drip detector for detecting presence of drops and leaks of fluid via measured changes in electrical resistances, comprising:

a first electrically conducting housing having a stationary electrical lead having a first end protruding into the housing and a second end protruding out of the housing, the lead being electrically insulated from the housing;

a first electrically conducting moving door means situated in the first housing;

a first electrically conducting, force transmitting and urging means situated in the first housing, with said force transmitting and urging means having a first end connected to the first end of the stationary lead and having a second moveable end urging the first door means outward away from the first end of the lead;

a second electrically conducting housing having a first and second ends, where at the first end, the second housing is mounted to the first housing, and with the second housing having a first conducting seat at the first end, such that the first urging means urges the first door against the first seat;

a second electrically conducting moving door means situated in the second housing, the second door means having a bore therein;

a second electrically conducting, force transmitting and urging means having a stationary end and a moveable end that is situated in the second housing;

a third electrically conducting housing having a first and second ends, where at the first end, the third housing is mounted to the second end of the second housing, and with the first end of the third housing having a second conducting seat, such that the moveable end of said second urging means urges the second door means against the stationary second seat, whereby in a drip condition, both of said first and second doors disengage from their respective seats;

a hollow conducting rod connected to the first door means and slidingly fitted into the bore of the second door means, for allowing the two doors to move independently of each other, whereby, in a no drip condition, if dirt or solid particle contamination separates the first door from the first seat due to, fluid contaminant mechanical interference therebetween, the first door pulls the rod, which slides freely in the bore of the second door, thus permitting the second door to continuously engage the second seat without any disturbing effects due to said contaminant interference at said first door, and further, if dirt or solid particle contamination separates the second door from the second seat, the second door slides freely on the rod away from the second seat free of any resultant effect on said first door, thus leaving the first door engaged with the first seat, and an electric resistance detector means connected to the electrical lead and across the housing for producing an electrical output in the event of a drip condition.

5. A fluid drip detector as in claim 1, wherein when a drip condition occurs, the electrical output activates an alarm and/or a cutoff valve to shut off the fluid supply.

6. A fluid drip detector as in claim 1 connected in fluid communication with a sprinkler-type fire suppressant system comprising a fluid pipe, alarm and a sprinkler, such that when the detector senses the sprinkler spraying fluid, the alarm is activated.

7. A fluid drip detector as in claim 4, wherein the electrical resistance detector means comprises a pulse generating means for generating electrical pulsating signals for continuously checking the electrical resistance between the housing and the lead.

8. A fluid drip detector as in claim 1, wherein the drip detector additionally comprises an adjustable timer means connected to said resistance detector means, for selecting a time period over which continuous fluid flow or movement is permitted through said housing, while ignoring the electrical output of the resistance detector means over that time period.

9. A fluid drip detector as in claim 1, wherein the drip detector additionally comprises an adjustable timer means connected to the electrical output of the ohmmeter instrument or other electrical resistance detector means, the timer means comprises;

a timer;

time selecting means for initializing the timer, the time selecting means having at least two settings for different time periods, a first, short time setting, and a second, long time setting, whereby the time selecting means can be set by the user, either by manually setting a selector, or electrically, by an electrical signal of preset duration outputed by the detecting means, such that fluid can continuously pass through the housing for any period not exceeding the selected/set time period, while the electrical output of the detecting means is ignored over that selected/set time period, and further, if fluid passes through the housing after the selected/set period has lapsed, a signal is activated to notify the user, and/or a fluid shut off means is activated, to shut off the fluid, and an overriding means for extending the selected/set time-period to the longer, second predetermined period, the overriding means is activated by opening and closing any fluid valve for a preset time, where the opening of the fluid valve increases the electrical resistance measured at the detecting means, and further, the closing of the fluid valve decreases the electrical resistance measured at the detecting means, such that the detecting means outputs an electrical signal of preset duration which electrically resets the time selecting means to the longer, second predetermined period, permitting fluid flow through the housing for the longer, second predetermined period, while ignoring the electrical output of the detector means over that period, and further, when the second predetermined period has lapsed, the first predetermined period set/selected on the timer is automatically reverted back to.

10. The fluid drip detector as in claim 9, further comprising;

a warning means, for warning the user that water will be shut off within a third predetermined period if the timer does not receive an electrical signal from the drip detector, such that before the set/selected period has ended, the warning means temporarily activates the shut off means to temporarily shut off the fluid for a short predetermined period, after the warning means stops actuating the shut off means, within the third predetermined period, the user must either activate the overriding means in order to have continuous fluid flow for the longer, second predetermined period, or the user must shut off the fluid valve which resets the timer to the first predetermined period, otherwise, an electrical means will actuate the shut off means, and fluid will be shut off.

11. An adjustable timer unit connected to a fluid handling system including at least one length of conduit, a fluid shut-off valve or signal warning means, one, or more fluid valves and any fluid drip detector means which can provide an electrical output in response to fluid drip, leak, movement or flow, the timer means comprises:

a timer;

Time selecting means for initializing the timer, the time selecting means having at least two settings for different time periods, including a first, short time setting, and a second, long time setting, whereby the time selecting means can be set by a user of said fluid handling system, either by manually setting a selector, or electrically, by an electrical signal of preset duration as outputted by the detecting means, such that fluid can continuously pass through the detecting means for any period not exceeding the selected/set time period, while the electrical output of the detecting means is ignored by the timer over that same time period, and further, if fluid passes through the detecting means after the selected/set time period has lapsed, a signal is activated to notify the user, and/or a fluid shut off valve means is activated, to shut off the fluid, and an overriding means for extending the selected time-period to the longer, second predetermined period, the overriding means is activated by opening and closing any fluid valve for a preset time so as to provide a recognizable signal for transmission along said fluid handling system into said time selecting means and overriding means, such that the fluid detecting means provides an electrical signal of preset duration which electrically resets the time selecting means to the longer, second predetermined period, thus permitting fluid flow through the detecting means for the longer, second predetermined period, while ignoring the electrical output of the fluid detecting means over that period, and further, when the second predetermined period has lapsed, the first predetermined period selected/set on the timer is automatically reverted back to.

12. The fluid drip detector as in claim 11, further comprising:

a warning means, for warning the user that said fluid such as water in a water delivery system or supply conduit will be shut off within a third predetermined period if the timer does not receive an electrical signal from the fluid detecting means, such that before the set/selected period has ended, the warning means temporarily activates the shut off means to temporarily shut off the fluid for a short predetermined period, after the warning means stops actuating the shut off means, the user must activate the overriding means within the third predetermined period, or an electrical means will actuate the shut off valve, and fluid will be shut off.

13. A fluid drip detector as in claim 1 further comprising a one-way valve or a release valve, for releasing the back pressure from the outlet to the inlet.

14. A fluid drip detector as in claim 4 wherein the rod further comprises a first one way valve, such that back pressure from the first housing could vent out to the third housing, in order to keep the pressure in the first and third housing equal, and the second door further having a bore having a second one way valve, such that back pressure from the second housing could vent out to the third housing, in order to keep the pressure in the second and third housing equal.

15. A fluid drip detector as in claim 1, wherein the fluid drip detector reprograms, enables or sets a programmable integrated circuit chip to produce its designed output and/or implement its intended programmed course of action when a leak or drip condition occurs.

16. An adjustable timer unit as in claim 11 further comprising a false-alarm-deactivating means, for resetting the system to open fluid flow communication thru said fluid drip detector means in case of a false alarm.

17. A fluid drop detector for interconnection with fluid handling systems or components that detects the presence of drips and leaks of fluid via measured changes in degree of electrical contact which occur between adjacent surfaces of a moveable door part and a stationary switch part initially sharing mechanical contact in said fluid drip detector, comprising:

a hollow housing for permitting fluid flow and passage therethrough, the housing having a seats disposed therein;

a flexible door means with a moveable center portion situated in said housing and urged against the seat, in order to close and open fluid communication through said housing from an inlet end towards an outlet end;

and said door means has mechanical communication with an electric switch, where said switch changes electrical state during a no leak condition, and whereby said electric switch will open and close to transmit an electrical signal before a fluid drop or leak passes across the door, thereby causing a decrease in pressure behind said door so that the center portion of said door will give to fluid pressure differential, which acts to move the center portion of said flexible door away from said switch before fluid will go through said housing from said inlet to said outlet in a steady leak condition as occurs when the fluid pressure differential becomes large enough to physically separate the complete mass of said door away from said seat, thereby forming a gap passage for said fluid to leak between the adjunct said door and seat.

* * * * *